(12) United States Patent
Haller

(10) Patent No.: US 11,440,443 B2
(45) Date of Patent: Sep. 13, 2022

(54) VEHICLE SEAT

(71) Applicant: GRAMMER AG, Ursensollen (DE)

(72) Inventor: Erwin Haller, Birgland (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 17/082,410

(22) Filed: Oct. 28, 2020

(65) Prior Publication Data

US 2021/0122267 A1 Apr. 29, 2021

(30) Foreign Application Priority Data

Oct. 29, 2019 (DE) .......................... 102019129174.7

(51) Int. Cl.
*B60N 2/20* (2006.01)
*B60N 2/02* (2006.01)
*B64D 11/06* (2006.01)
*A47C 1/032* (2006.01)
*B60N 2/22* (2006.01)

(52) U.S. Cl.
CPC ............. *B60N 2/20* (2013.01); *B60N 2/0284* (2013.01); *A47C 1/032* (2013.01); *B60N 2/2209* (2013.01); *B64D 11/064* (2014.12)

(58) Field of Classification Search
CPC .. B60N 2/2209; B60N 2/0284; B64D 11/064; A47C 1/032
See application file for complete search history.

(56) References Cited

U.S. PATENT DOCUMENTS

| 3,043,621 | A | | 7/1962 | Fletcher | |
|---|---|---|---|---|---|
| 3,104,128 | A | | 9/1963 | Schliephacke | |
| 3,166,353 | A | | 1/1965 | Re | |
| 3,198,576 | A | * | 8/1965 | Rosmarin | A47C 1/032 297/342 |
| 3,869,172 | A | * | 3/1975 | James | A47C 1/032 297/316 |
| 4,226,473 | A | * | 10/1980 | Johnson | A47C 1/032 297/316 |
| 4,350,387 | A | | 9/1982 | Rogers, Jr. | |
| 4,452,486 | A | * | 6/1984 | Zapf | A47C 1/03272 297/343 |

(Continued)

FOREIGN PATENT DOCUMENTS

| DE | 4405653 | 8/1994 |
|---|---|---|
| DE | 19823632 | 9/1999 |

(Continued)

OTHER PUBLICATIONS

Extended Search Report for European Patent Application No. 20203404.7, dated Mar. 17, 2021, 7 pages.

(Continued)

*Primary Examiner* — Syed A Islam

(74) *Attorney, Agent, or Firm* — Sheridan Ross P.C.

(57) ABSTRACT

Vehicle seat comprising a backrest, a seat part and a seat part upper portion connected to the seat part and displaceable relative to the seat part, the backrest being connected to the seat part in such a manner as to be rotatable about a first axis of rotation, characterised in that the backrest and the seat part upper portion are connected to one another in such a way that, when the backrest is rotated about the first axis of rotation, the seat part upper portion is displaced relative to the seat part.

17 Claims, 5 Drawing Sheets

(56) References Cited

U.S. PATENT DOCUMENTS

| | | | | |
|---|---|---|---|---|
| 4,504,090 | A | * | 3/1985 | Goldman .......... A47C 1/03255 |
| | | | | 297/317 |
| 5,374,101 | A | | 12/1994 | Wiecek |
| 6,135,559 | A | | 10/2000 | Kowalski |
| 6,481,798 | B2 | * | 11/2002 | Romca .................. B64D 11/06 |
| | | | | 297/340 |
| 8,272,694 | B2 | * | 9/2012 | Hawkins ................ B64D 11/06 |
| | | | | 297/341 |
| 9,701,221 | B2 | * | 7/2017 | Nagayasu ................ B60N 2/22 |
| 10,744,912 | B2 | | 8/2020 | Haller |
| 2013/0134758 | A1 | | 5/2013 | Kladde |
| 2014/0265501 | A1 | | 9/2014 | Line et al. |
| 2021/0155124 | A1 | | 5/2021 | Haller |

FOREIGN PATENT DOCUMENTS

| | | |
|---|---|---|
| DE | 202012003009 | 6/2013 |
| DE | 202014104538 | 11/2014 |
| DE | 102017128410 | 6/2019 |
| EP | 0265782 | 5/1988 |
| EP | 3181397 | 6/2017 |
| EP | 3505393 | 7/2019 |

OTHER PUBLICATIONS

Official Action for German Patent Application No. 102019129174.7, dated Jun. 22, 2020, 6 pages.
Official Action for German Patent Application No. 102019131595.6, dated Jun. 3, 2020, 6 pages.
Extended Search Report with machine translation for European Patent Application No. 20203403.9, dated Mar. 25, 2021, 7 pages.
Official Action for U.S. Appl. No. 17/082,386, dated Sep. 20, 2021 7 pages.
Official Action with machine translation for European Patent Application No. 20203404.7, dated Nov. 8, 2021, 9 pages.
Official Action with English Translation for German Patent Application No. 102019129174.7, dated Sep. 10, 2021, 5 pages.

* cited by examiner

VEHICLE SEAT

CROSS-REFERENCE TO RELATED APPLICATIONS

This application claims the benefit of German Patent Application No. 10 2019 129 174.7 filed Oct. 29, 2019, the entire contents of which are incorporated herein by reference.

FIELD

The invention relates to a vehicle seat comprising a backrest, a seat part and a seat part upper portion connected to the seat part and displaceable relative to the seat part, the backrest being connected to the seat part in such a manner as to be rotatable about a first axis of rotation.

BACKGROUND

Such vehicle seats are known from the prior art, the settings of the backrest inclination and the seat upper part position being adjustable independently of one another. When the backrest inclination changes, the problem arises that the change in the backrest inclination also changes the position of the SIP point or the H point of the vehicle seat, in particular towards the front when the backrest inclination changes towards the rear; that is, the usable space on the seat part upper portion is reduced. In order to be able to correct this, it is necessary for the seat part upper portion to be adjusted according to the change in the backrest inclination.

SUMMARY

It is therefore the object of the present invention to provide a vehicle seat by means of which it is possible, by a synchronous change in the seat part upper portion position when the backrest inclination changes, for no change to be caused in the SIP point or H point.

The object is achieved by a vehicle seat comprising a backrest, a seat part and a seat part upper portion connected to the seat part and displaceable relative to the seat part, the backrest being connected to the seat part in such a manner as to be rotatable about a first axis of rotation, the backrest and the seat part upper portion being connected to one another in such a way that, when the backrest is rotated about the first axis of rotation, the seat part upper portion is displaced relative to the seat part.

This means that, when the backrest is rotated about the first axis of rotation, the seat part upper portion is displaced synchronously or simultaneously. This can prevent the position of the SIP point or the H point of the vehicle seat from being changed and the driver having to assume a different seating position.

In particular, the position of the seat part upper portion is automatically adjusted due to the rotation of the backrest.

According to a particularly preferred embodiment, the seat part upper portion is displaceable, preferably translationally displaceable, in a vehicle seat longitudinal direction.

A displacement in the vehicle seat longitudinal direction is understood to mean, in particular, a displacement towards the front or towards the rear in the vehicle seat longitudinal direction.

According to a particularly preferred embodiment, the backrest and the seat part upper portion are connected by means of a first lever element, which is connected to the backrest in such a manner as to be rotatable about a second axis of rotation and connected to the seat part upper portion in such a manner as to be rotatable about a third axis of rotation.

By means of such a design, i.e. by means of the first lever element, the backrest and the seat part upper portion are connected to one another in such a way that the rotation of the backrest can be translated into a displacement of the seat part upper portion by rotating the backrest via the first lever element.

According to another preferred embodiment, it is provided that the backrest and the seat part upper portion are connected by means of a first lever element and a second lever element, which are respectively connected to the backrest in such a manner as to be rotatable about a second axis of rotation and connected to the seat part upper portion in such a manner as to be rotatable about a third axis of rotation.

The arrangement of the first lever element and, where applicable, the second lever element in relation to the backrest and seat part upper portion can essentially be discretionary.

In the embodiment in which only a first lever element is provided, it is advantageous that the first lever element is arranged centrally with respect to the backrest and the seat part upper portion in relation to a vehicle seat width direction, so that the risk of the seat part upper portion getting wedged can be reduced.

In the embodiment having a first lever element and a second lever element, it is advantageous if the lever elements are arranged at a distal end and proximal end as seen in the vehicle seat width direction, or to the left and right as seen in the vehicle seat longitudinal direction at the ends of the backrest and the seat part upper portion.

According to a further preferred embodiment, it is provided that, viewed in a vehicle seat height direction, the first axis of rotation is arranged above the second axis of rotation. The second axis of rotation is preferably arranged above the third axis of rotation in the vehicle seat height direction.

In particular, by arranging the second axis of rotation above the third axis of rotation, a dead point of the lever elements can be prevented.

According to a particularly preferred embodiment, the first lever element is arranged at a first angle to a vehicle seat longitudinal direction, the first angle changing during the rotation of the backrest, the first angle preferably having a value greater than 90° and less than 180°, more preferably greater than 100° and less than 175° and particularly preferably greater than 150° and less than 170°.

The same also applies to the second lever element. The statements with regard to the first lever element also apply in an analogous manner essentially to the second lever element.

According to a further preferred embodiment, a connecting line between the first axis of rotation and the second axis of rotation is arranged in a first position of the backrest relative to the seat part at a first angle of rotation relative to a vehicle seat height direction and in a second position of the backrest relative to the seat part at a second angle of rotation relative to the vehicle seat height direction, the first angle of rotation preferably being greater than 0° and the second angle of rotation greater than 10°.

An inclination of the backrest can be defined by the first and second angle of rotation, namely by 90—first/second angle of rotation. The first angle of rotation can particularly preferably be 5° and the second angle of rotation 30° or more.

Particularly preferably, the first lever element and the second lever element are designed identically and are also arranged in the same way with respect to the backrest and the seat part upper portion.

Furthermore, it is provided according to a preferred embodiment that the backrest comprises a first connecting element by means of which the first lever element is rotatably connected to the backrest, and the seat part upper portion comprising a second connecting element by means of which the first lever element is rotatably connected to the seat part upper portion.

Further advantageous embodiments result from the dependent claims.

BRIEF DESCRIPTION OF THE DRAWINGS

Additional aims, advantages and expediencies of the present invention can be found in the following description in conjunction with the drawings, in which:

FIG. 4AA is an enlargement of a detail of FIG. 4A;

FIG. 4BB is an enlargement of a detail of FIG. 4B.

DETAILED DESCRIPTION

For the sake of clarity, elements in some figures may not have reference signs that have already been designated in other figures.

Figure 1A:
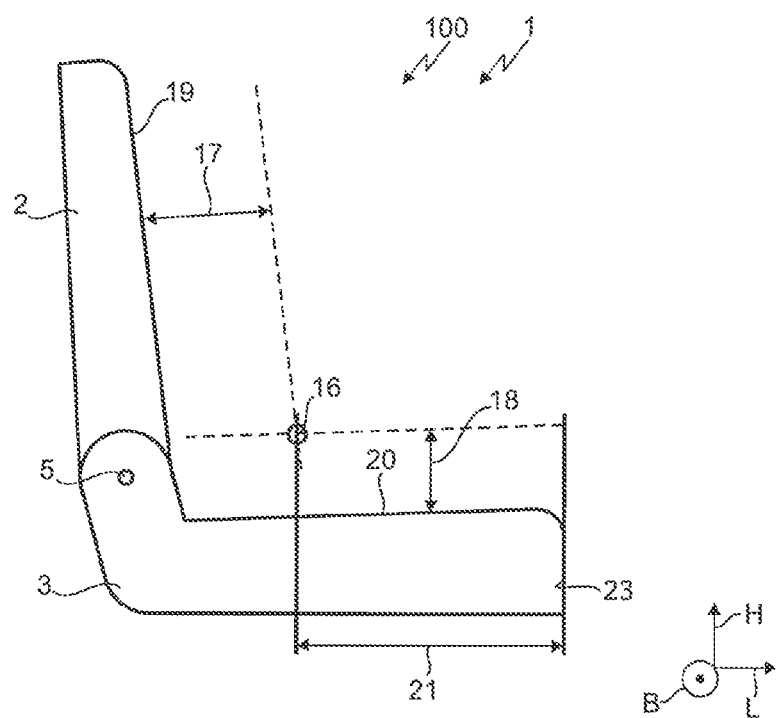
FIG. 1A shows a vehicle seat in a schematic representation in a first position according to the prior art.
Figure 1B:
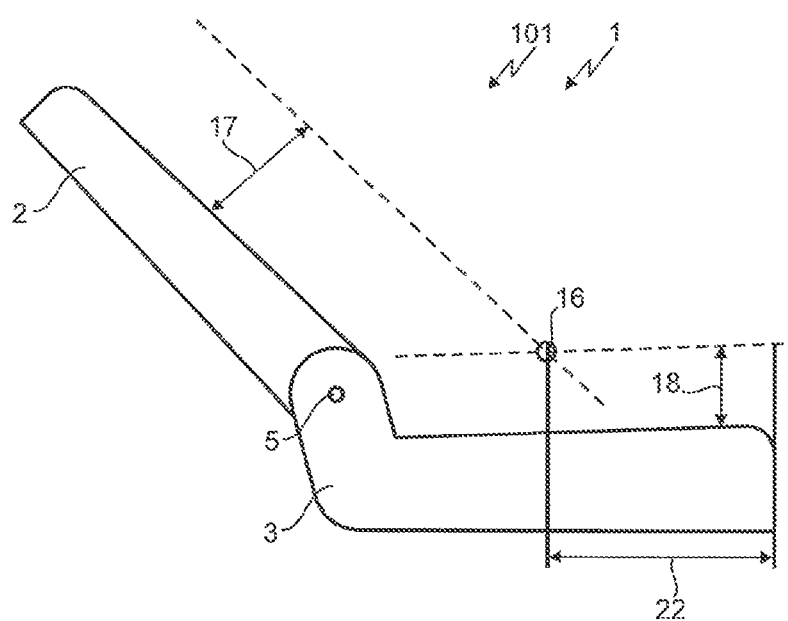
FIG. 1B shows the vehicle seat of FIG. 1A in a second position.

FIG. 1A and 1B show the situation from the prior art in a schematic representation in comparison to the situation according to a vehicle seat 1 according to the invention of the present application, likewise in a schematic representation.

In the present vehicle seat 1 according to the prior art, shown in FIG. 1A and 1B, the vehicle seat 1 has a backrest 2 and a seat part 3, the backrest 2 being rotatable about a first axis of rotation 5 relative to the seat part 2, the backrest 2 being rotatably connected to the seat part 2.

An SIP point 16 or an H point 16, which are understood to be synonymous hereinafter, can be determined by an SRP point, i.e. an intersection of a backrest surface 19 and a seat surface 20 which yields the position of the SIP point 16 in a manner governed by standards.

The SIP point 16 thus has a first distance 17 from the backrest surface 19 and a second distance 18 from the seat surface 20.

In order to represent the seat surface available for a person, a third distance 21, which describes the length from the SIP point to a front face 23 of the seat part 3 as seen in the vehicle seat longitudinal direction L, is particularly crucial.

The vehicle seat 1 of FIG. 1A is shown in a first position 100, which can be defined by a rotational position of the backrest 2 relative to the seat part 2, namely a maximum rotational position of the backrest 2 with the direction of rotation in the vehicle seat longitudinal direction L towards the front.

The vehicle seat of FIG. 1B is shown in a second position 101, which can be defined by a rotational position of the backrest 2 relative to the seat part 2, namely a maximum rotational position of the backrest 2 with the direction of rotation in the vehicle seat longitudinal direction L towards the rear.

The backrest 2 of the vehicle seat 1 in the second position 101 was rotated maximally towards the rear as seen in the vehicle seat longitudinal direction L. Since the first distance 17 and the second distance 18 remain the same, the SIP point 16 moves towards the front in the vehicle seat longitudinal direction L, so that a fourth distance 22 is set between the SIP point 16 and the front face 23, the fourth distance 22 being smaller than the third distance 21, so that the available seat surface is reduced.

Figure 2A:
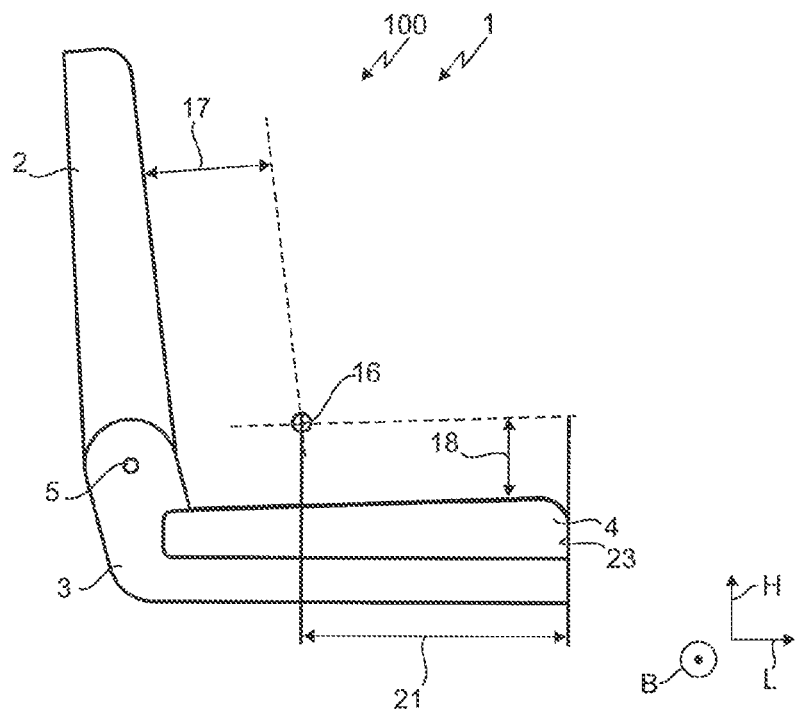
FIG. 2A shows a vehicle seat according to the invention in a schematic representation in a first position.

In FIG. 2A, the vehicle seat 1 is shown in the first position 100 and in FIG. 2A in the second position 2B.

The vehicle seat 1 further comprises a seat part upper portion 4, which is displaceable relative to the seat part 3, specifically as a function of the rotational position of the backrest 2 relative to the seat part 3.

The position of the SIP point 16 in FIG. 2A corresponds to the position of the SIP point in FIG. 1A. However, the position of the SIP point 16 in FIG. 2A differs from the position in FIG. 1A.

Figure 2B:
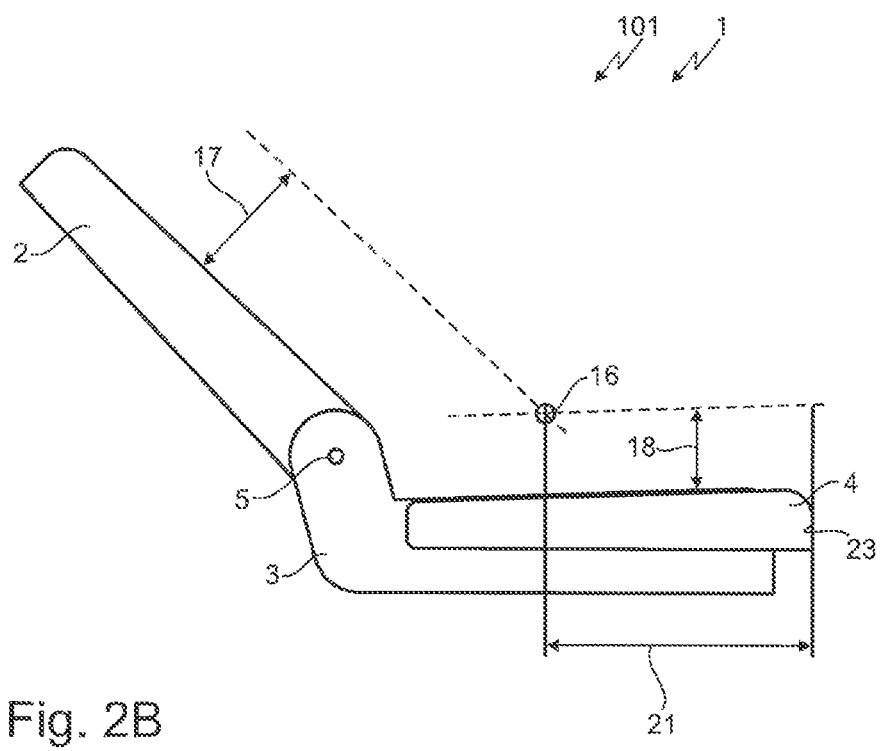
FIG. 2B shows the vehicle seat according to FIG. 2A in a second position.

As can be seen in the comparison of FIG. 2A and 2B, the seat part upper portion 4 in FIG. 2B is displaced relative to the seat part 3, in particular in such a way that the third distance 21 is essentially maintained; that is, the available seat surface does not change upon rotation of the backrest 2 about the first axis of rotation 5.

It should be noted that the front face 23 is to be regarded as a part of the seat part upper portion 4.

Furthermore, it is of course conceivable that the vehicle seat 1 can assume intermediate positions between the first position 100 and the second position 101, that is to say that the angle of rotation is between the maximum angle of rotation towards the front and the maximum angle of rotation towards the rear. The displacement of the seat part upper portion 4 is corresponding.

The more precise design of the vehicle seat 1 is shown in more detail in the following figures.

The backrest 2 has a backrest frame 2', the seat part 3 has a seat part frame 3' and the seat part upper portion 4 has a seat part upper portion frame 4'. The backrest 2, the seat part 3 and the seat part upper portion 4 can preferably also have covers and/or cushions.

Figure 3A:
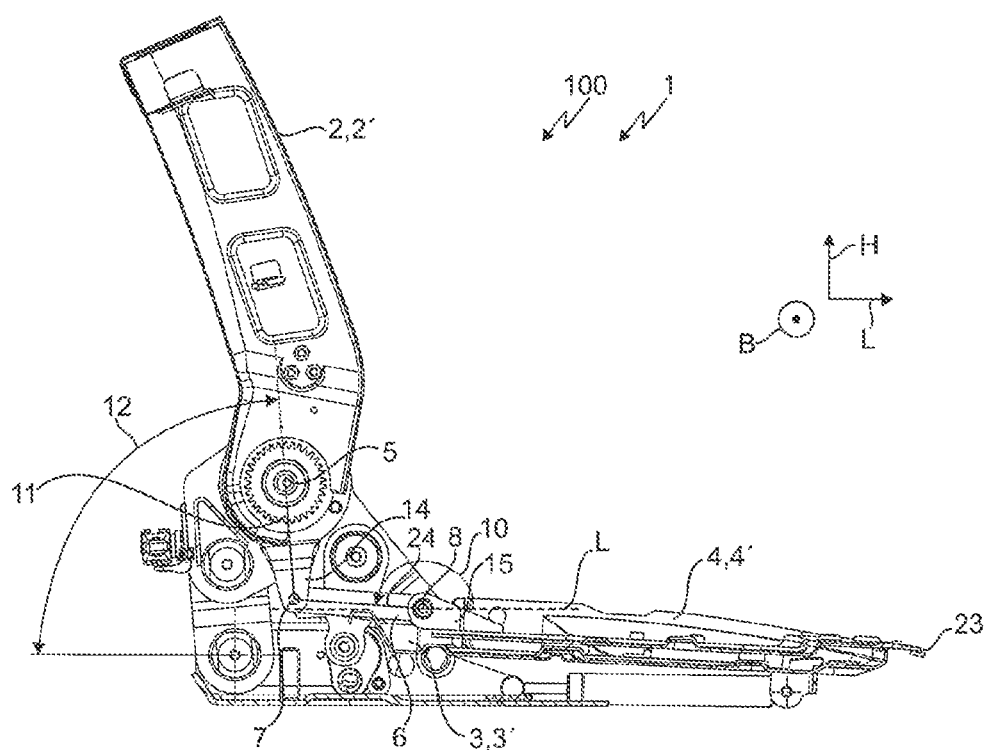
FIG. 3A shows the vehicle seat according to a preferred embodiment in a sectional view in the first position.
Figure 3B:
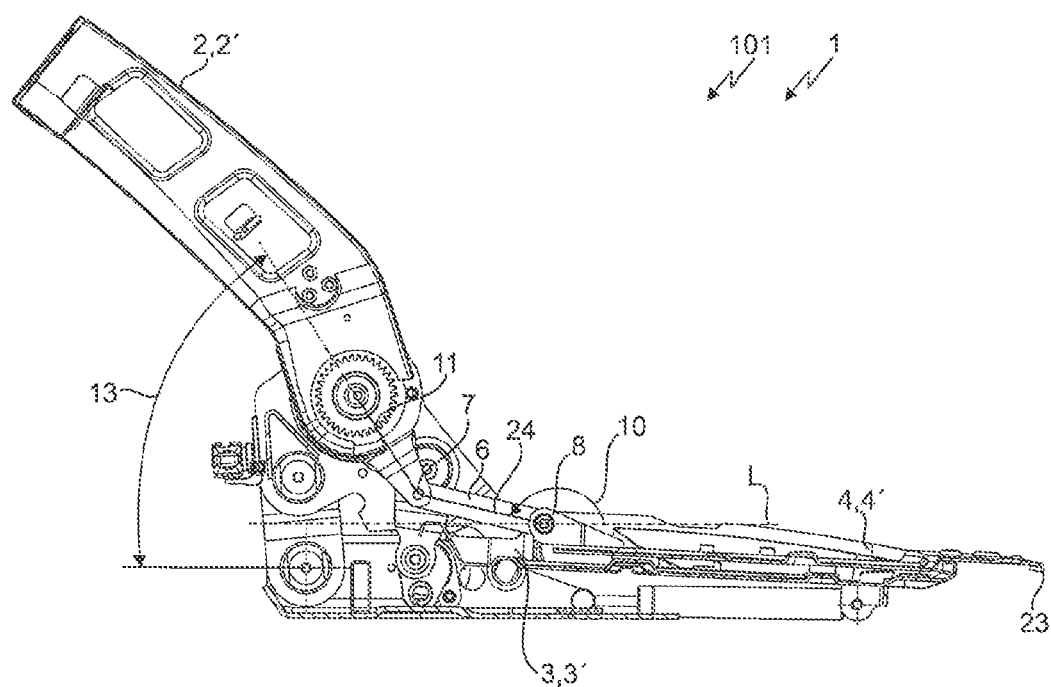
FIG. 3B shows the vehicle seat according to FIG. 3A in the second position.

In FIG. 3A and 3B, the vehicle seat 1 is shown according to a preferred embodiment in a sectional illustration in a side view, it being clear that the backrest 2 comprises a first connecting element 14 and the seat part upper portion 4 comprises a second connecting element 15.

A first lever element 6 can also be seen, which on the one hand is connected to the backrest 2, in particular to the first connecting element 14, in such a manner as to be rotatable about a second axis of rotation 7, and on the other hand is connected to the seat part upper portion 4, in particular to the second connecting element 15, in such a manner as to be rotatable about a third axis of rotation 8.

It can also be seen from FIG. 3A and 3B that the first lever element 6 is arranged at a first angle 10 to the vehicle seat longitudinal direction L, the first angle 10 being able to assume different values depending on the angle of rotation of the backrest 2 relative to the seat part 3. The first angle 10 is smaller than 180°, so that a dead point of the lever mechanism can be prevented.

The relationship between the angle of rotation and the first angle 10 is such that, when the angle of rotation decreases, the first angle 10 increases.

In particular, a second connecting line 24, which is associated with the first lever element 6 and is defined as a connection between the second axis of rotation 7 and the third axis of rotation 8, is arranged at the first angle 10 to the vehicle seat longitudinal direction L.

The shape of the first lever element 6 can in principle be of any desired shape, it being preferred that the first lever element 6 has an elongated design.

Particularly preferably, as seen in each case in the vehicle seat height direction H, the second axis of rotation 7 is arranged below the first axis of rotation 5 and the third axis of rotation 8 is arranged below the second axis of rotation 7. This leads in particular to the lever element 6 being arranged at the first angle 10 to the vehicle seat longitudinal direction L.

Furthermore, the angle of rotation of the backrest 2 relative to the seat part 3 can be defined as an angle between a first connecting line 11 and the vehicle seat longitudinal direction L, the first connecting line 11 being defined as the connecting line between the first axis of rotation 5 and the second axis of rotation 7.

The second axis of rotation 7 is arranged with respect to the backrest 2, in particular by means of the first connecting element 14, in such a way that when the backrest 2 is rotated towards the rear as seen in the vehicle seat longitudinal direction L, the second axis of rotation 7 rotates towards the front in the vehicle seat longitudinal direction; that is, the second axis of rotation 7 is displaced towards the front in the vehicle seat longitudinal direction L and upwards in the vehicle seat height direction H.

This displacement of the second axis of rotation 7 causes the seat part upper portion 4 to be displaced towards the front by means of the first lever element 6.

The same also applies to a rotation of the backrest 2 towards the front, so that the second axis of rotation 7 is displaced towards the rear in the vehicle seat longitudinal direction L and downwards in the vehicle seat height direction H, corresponding to a rotation towards the rear, as a result of which the seat part upper portion 4 is displaced towards the rear, as seen in the vehicle seat longitudinal direction L.

Figure 4A:
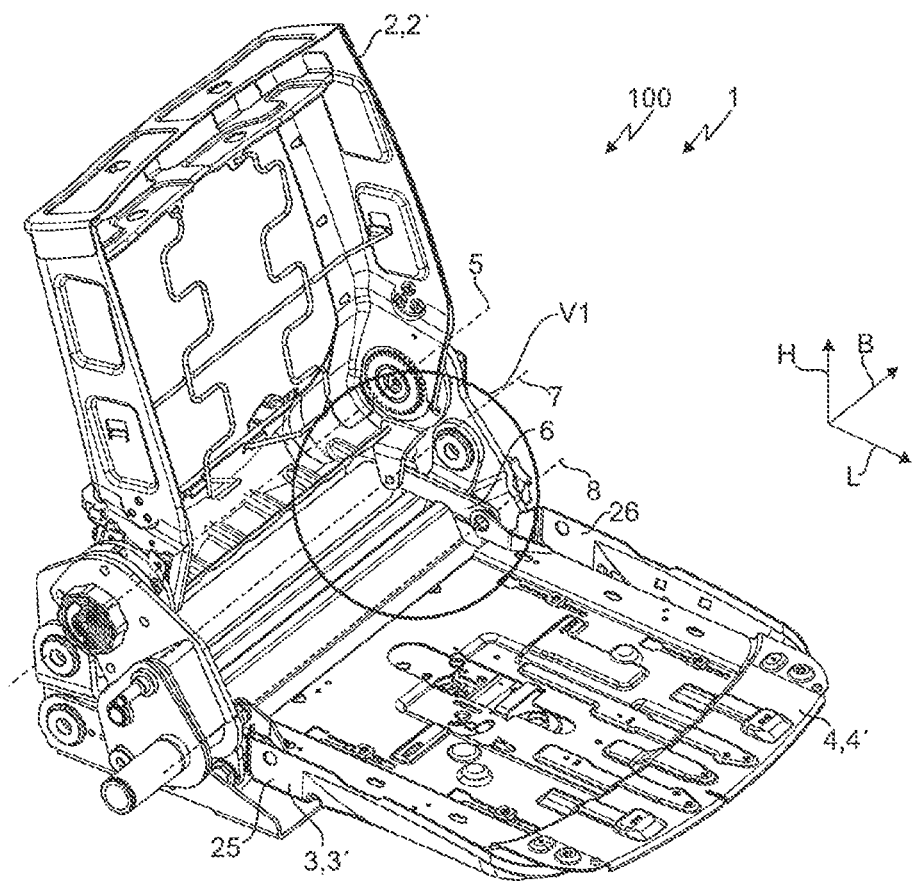
FIG. 4A shows the vehicle seat according to a preferred embodiment in a perspective view in the first position.
Figure 4A:
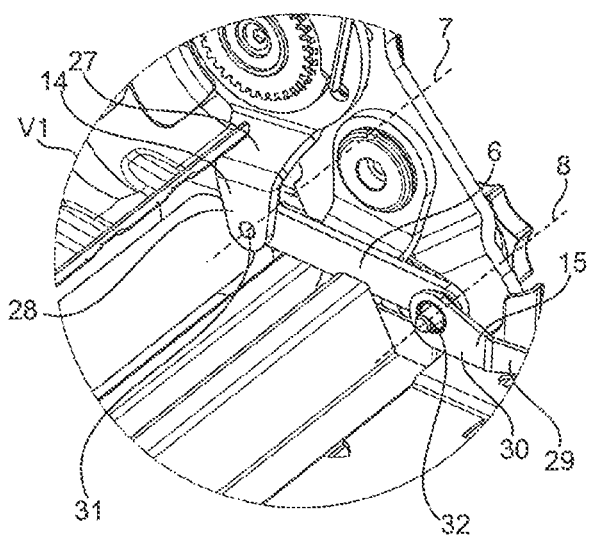

In FIG. 4A, 4AA, 4B and 4BB, the vehicle seat 1 is shown according to a preferred embodiment in perspective views and associated enlargements.

In particular, a first side wall 25 and a second side wall 26 of the seat part 3, in particular of the seat part frame 3', which preferably extend in the vehicle seat longitudinal direction L and the vehicle seat height direction H and, as seen in the vehicle seat width direction B, are arranged at a proximal and a distal end of the seat part 3.

The side walls 25, 26 are such that the side walls 25, 26 guide the seat part upper portion 4, in particular the seat part upper portion frame 4', in the vehicle seat longitudinal direction L when the seat part upper portion 4 is displaced.

The enlargement of the area V1 of FIG. 4A can be seen in FIG. 4AA. In particular, reference is made to the design of the lever mechanism.

As is evident from the enlargement V1, a first connecting element 14 and a second connecting element 15 can be seen.

The first lever element 6 is connected to the seat part upper portion 4, in particular to the first connecting element 14, in such a manner as to be rotatable about the second axis of rotation 7 and is connected to the seat part upper portion 4, in particular to the second connecting element 15, in such a manner as to be rotatable about the third axis of rotation 8.

The first connecting element 14 is rigidly connected to the backrest 2 and preferably has a first portion 27 and a second portion 28. The first portion 27 preferably runs in the vehicle seat width direction B and in the vehicle seat height direction, that is to say, when seen as a whole, at an angle to the vehicle seat height direction H.

The second connecting element 15 has a third portion 29 and a fourth portion 30, the third portion 29 preferably extending in the vehicle seat width direction B and in the vehicle seat longitudinal direction L, i.e. at an angle to the vehicle seat longitudinal direction L. The fourth portion 30 extends in particular in the vehicle seat longitudinal direction L such that the main extent is parallel to the vehicle seat longitudinal direction L.

The first lever element 6 is particularly preferably rotatably connected to the backrest 2 by means of a first shaft piece 31 and to the seat part upper portion 4 by means of a second shaft piece 32.

Figure 4B:
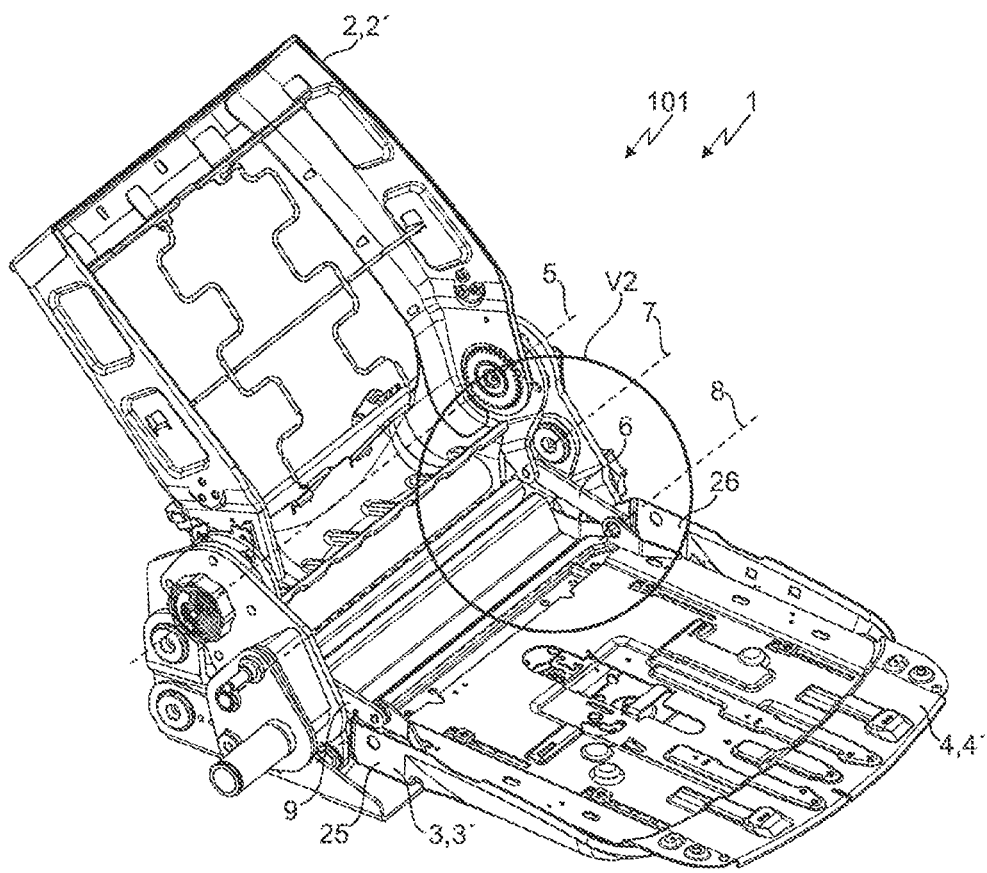
FIG. 4B shows the vehicle seat according to a preferred embodiment in a perspective view in the second position.
Figure 4B:
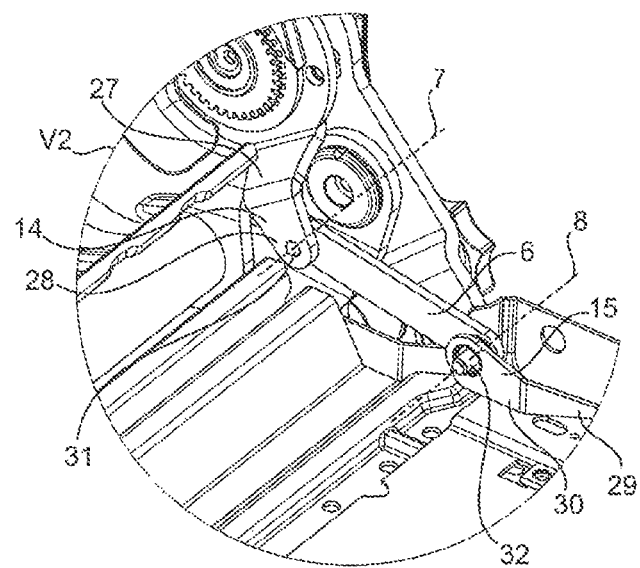

FIG. 4B shows the vehicle seat 1 from FIG. 4A in the second position 101, and accordingly the detail V2 from FIG. 4A, illustrated in FIG. 4AA, shows the correspondingly moved lever arrangement.

A second lever element 9 can also be seen in FIG. 4A and 4B. The statements relating to the first lever element 6 also apply analogously to the second lever element 9. In particular, the second lever element 9 has an arrangement that mirrors the first lever element, but with the same elements. Furthermore, the first lever element 6 and the second lever element are of identical design.

All features disclosed in the application documents are claimed as being essential to the invention, provided that they are, individually or in combination, novel over the prior art.

LIST OF REFERENCE SIGNS

1 Vehicle seat
2 Backrest
3 Seat part
4 Seat part upper portion
5 First axis of rotation
6 First lever element
7 Second axis of rotation
8 Third axis of rotation
9 Second lever element
10 First angle
11 Connecting line
12 First angle of rotation
13 Second angle of rotation
14 First connecting element
15 Second connecting element
16 SIP point
17 First distance
18 Second distance
19 Backrest surface
20 Seat surface
21 Third distance
22 Fourth distance
23 Front face
24 Second connecting line
25 First side wall 26 Second side wall
27 First portion
28 Second portion
29 Third portion
30 Fourth portion
31 First shaft piece
32 Second shaft piece
100 First position
101 Second position
L Vehicle seat longitudinal direction
B Vehicle seat width direction
H Vehicle seat height direction

What is claimed is:

1. A vehicle seat, comprising:
a backrest, wherein the backrest includes a first connecting element;
a seat part; and
a seat part upper portion connected to the seat part and displaceable relative to the seat part wherein the seat part upper portion includes a second connecting element,
wherein the backrest is connected to the seat part in such a manner as to be rotatable about a first axis of rotation,
wherein the backrest is rotatably connected to a first end of a first lever element by the first connecting element at a second axis of rotation and the seat part upper portion is rotatably connected to a second end of the first lever element by the second connecting element at a third axis of rotation,
wherein the first connecting element has a first portion and a second portion,
wherein the first portion of the first connecting element is at an angle in a vehicle seat height direction,
wherein the second connecting element has a third portion and a fourth portion,
wherein the third portion of the second connecting element extends in a width direction of the vehicle seat and at an angle to a vehicle seat longitudinal direction, and
wherein the first axis of rotation is above the second axis of rotation along a height axis normal to a vehicle floor, such that, when the backrest is rotated about the first axis of rotation, the seat part upper portion is displaced relative to the seat part by the first lever element.

2. The vehicle seat according to claim 1, wherein the seat part upper portion is displaceable, preferably translationally displaceable, in the vehicle seat longitudinal direction.

3. The vehicle seat according to claim 1, wherein the first lever element is a single piece.

4. The vehicle seat according to claim 1, wherein the backrest and the seat part upper portion are connected by the first lever element and a second lever element,
wherein a first end of the second lever element is connected to the backrest at the second axis of rotation and a second end of the second lever element is connected to the seat part upper portion at the third axis of rotation, and
wherein the first lever element and the second lever element are separated by a distance along a width axis that is parallel to the first axis of rotation.

5. The vehicle seat according to claim 1, wherein the second axis of rotation is located above the third axis of rotation along the height axis.

6. The vehicle seat according to claim 1, wherein the first lever element is arranged at a first angle to the vehicle seat longitudinal direction, the first angle changing during rotation of the backrest, the first angle having a value of greater than 90° and less than 180°.

7. The vehicle seat according to claim 1,
wherein a connecting line between the first axis of rotation and the second axis of rotation is arranged:
in a first position of the backrest relative to the seat part at a first angle of rotation relative to the vehicle seat height direction; and
in a second position of the backrest relative to the seat part at a second angle of rotation relative to the vehicle seat height direction, wherein the first angle of rotation is greater than 0° and the second angle of rotation greater than 10°.

8. The vehicle seat according to claim 1, wherein a distance between the first axis of rotation and the second axis of rotation is constant.

9. The vehicle seat according to claim 8, wherein a distance between the second axis of rotation and the third axis of rotation is constant.

10. The vehicle seat according to claim 1, wherein a distance between the second axis of rotation and the third axis of rotation is constant.

11. The vehicle seat according to claim 1, wherein the first lever element is arranged at a first angle to the vehicle seat longitudinal direction, the first angle changing during the rotation of the backrest, the first angle having a value of greater than 100° and less than 175°.

12. The vehicle seat according to claim 1, wherein the first lever element is arranged at a first angle to the vehicle seat longitudinal direction, the first angle changing during the rotation of the backrest, the first angle having a value of greater than 150° and less than 170°.

13. The vehicle seat according to claim 1, wherein the seat part is only displaceable in the vehicle seat longitudinal direction.

14. The vehicle seat according to claim 1, wherein a seat index point (SIP) remains constant while the backrest rotates.

15. The vehicle seat according to claim 1, wherein the first axis of rotation is always above the second axis of rotation.

16. The vehicle seat according to claim 1, wherein the first connecting element is rigidly connected to the backrest.

17. The vehicle seat according to claim 1, wherein the first connecting element and the second connecting element are connected to the first lever element by a first shaft piece and a second shaft piece, respectively.

* * * * *